（12） United States Patent
Ko

(10) Patent No.: US 12,476,310 B2
(45) Date of Patent: Nov. 18, 2025

(54) SECONDARY BATTERY AND MANUFACTURING METHOD OF SECONDARY BATTERY

(71) Applicant: Samsung SDI Co., Ltd., Yongin-si (KR)

(72) Inventor: Sung Gwi Ko, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 418 days.

(21) Appl. No.: 18/012,891

(22) PCT Filed: Nov. 12, 2021

(86) PCT No.: PCT/KR2021/016519
§ 371 (c)(1),
(2) Date: Dec. 23, 2022

(87) PCT Pub. No.: WO2022/108253
PCT Pub. Date: May 27, 2022

(65) Prior Publication Data
US 2023/0207934 A1    Jun. 29, 2023

(30) Foreign Application Priority Data
Nov. 23, 2020   (KR) ................... 10-2020-0157660

(51) Int. Cl.
*H01M 50/184* (2021.01)
*H01M 50/186* (2021.01)
*H01M 50/367* (2021.01)
*H01M 50/547* (2021.01)

(52) U.S. Cl.
CPC ....... *H01M 50/184* (2021.01); *H01M 50/186* (2021.01); *H01M 50/367* (2021.01); *H01M 50/547* (2021.01)

(58) Field of Classification Search
CPC ............ H01M 50/184; H01M 50/186; H01M 50/547; H01M 50/367
See application file for complete search history.

(56) References Cited

U.S. PATENT DOCUMENTS 7,303,836 B2   12/2007  Kim
7,550,225 B2    6/2009  Meguro et al.
(Continued)

FOREIGN PATENT DOCUMENTS

CN      201708194 U    1/2011
CN      110957438 A    4/2020
(Continued)

OTHER PUBLICATIONS

International Search Report for PCT/KR2021/016519 dated Feb. 21, 2022, 7 pages.
(Continued)

*Primary Examiner* — Sarah A. Slifka
(74) *Attorney, Agent, or Firm* — Womble Bond Dickinson (US) LLP

(57) ABSTRACT

The present invention relates to a secondary battery, which has a simplified cap assembly structure to ensure an inner space, and thus can have increased capacity. Disclosed in one embodiment is a secondary battery comprising: an electrode assembly; a case for accommodating the electrode assembly; and a cap assembly coupled to the top of the case and electrically connected to the electrode assembly, wherein the cap assembly comprises: a cap plate having a ring-shaped first groove formed on the upper surface thereof, and a ring-shaped second groove formed on the lower surface thereof and connected to the first groove; and an insulation member insert-injected into the first groove.

12 Claims, 2 Drawing Sheets

(56) References Cited

U.S. PATENT DOCUMENTS

| | | |
|---|---|---|
| 8,808,905 B2 | 8/2014 | Chang et al. |
| 2004/0091770 A1 | 5/2004 | Kim |
| 2007/0105016 A1 | 5/2007 | Chang et al. |
| 2008/0107957 A1 | 5/2008 | Meguro et al. |
| 2011/0281147 A1 | 11/2011 | Sun et al. |
| 2011/0287311 A1 | 11/2011 | Kim et al. |
| 2011/0300414 A1 | 12/2011 | Baek |
| 2014/0106209 A1 | 4/2014 | Deng et al. |
| 2014/0356700 A1 | 12/2014 | Song et al. |

FOREIGN PATENT DOCUMENTS

| | | |
|---|---|---|
| EP | 2727174 B1 | 8/2017 |
| JP | 2004-146362 A | 5/2004 |
| JP | 2007-200755 A | 8/2007 |
| KR | 10-0319112 B1 | 12/2001 |
| KR | 10-0719730 B1 | 5/2007 |
| KR | 10-2014-0040835 A | 4/2014 |
| KR | 10-2018-0018280 A | 2/2018 |
| KR | 10-2019-0093360 A | 8/2019 |
| KR | 10-2020-0020173 A | 2/2020 |
| WO | WO 2010-060321 A1 | 6/2010 |

OTHER PUBLICATIONS

Extended European Search Report dated Apr. 25, 2025, issued in corresponding European Patent Application No. 21895021.0, 12 pages.

Korean Office Action corresponding to KR Application No. 10-2020-0157660, dated Aug. 25, 2025 (6 pages).

SECONDARY BATTERY AND MANUFACTURING METHOD OF SECONDARY BATTERY

CROSS-REFERENCE TO RELATED APPLICATIONS

This application is a U.S. National Phase Patent Application of International Application Number PCT/KR2021/016519, filed on Nov. 12, 2021, which claims priority to Korean Patent Application Number 10-2020-0157660, filed on Nov. 23, 2020, the entire content of each of which is incorporated herein by reference.

TECHNICAL FIELD

The present invention relates to a secondary battery.

BACKGROUND ART

Unlike a primary battery that cannot be charged, a secondary battery is a rechargeable and dischargeable battery. A low-capacity secondary battery may be used for various portable small-sized electronic devices, such as a smartphone, a feature phone, a notebook computer, a digital camera, or a camcorder, and a high-capacity secondary battery is widely used as a power source for motor drives, such as those in hybrid vehicles or electric vehicles. These lithium ion secondary batteries may be classified into cylindrical, prismatic, and pouch-type secondary batteries in terms of shape.

Specifically, a cylindrical lithium secondary battery generally includes a cylindrical electrode assembly, a cylindrical case to which the electrode assembly is coupled, an electrolyte injected into the case to allow movement of lithium ions, and a cap assembly that is coupled to one side of the case to prevent leakage of the electrolyte solution and prevents separation of the electrode assembly.

The above information disclosed in this Background section is only for enhancement of understanding of the background of the invention and therefore it may contain information that does not constitute prior art.

DESCRIPTION OF EMBODIMENTS

Technical Problem

The present invention provides a secondary battery, which has a simplified cap assembly structure to ensure an inner space, and thus can have increased capacity.

Solution to Problem

A secondary battery according to the present invention may include: an electrode assembly; a case for accommodating the electrode assembly; and a cap assembly coupled to the top of the case and electrically connected to the electrode assembly, wherein the cap assembly comprises: a cap plate having a ring-shaped first groove formed on the upper surface thereof, and a ring-shaped second groove formed on the lower surface thereof and connected to the first groove; and an insulation member insert-injected into the first groove.

The cap plate may include a terminal region positioned inside the insulation member and a main plate positioned outside the insulation member.

An electrode tab of the electrode assembly may be connected to the terminal region.

Protruding grooves may be formed on inner and outer walls of the first groove in a horizontal direction.

The insulation member may include protrusions coupled to the protruding grooves.

The cap plate may further include a hole formed outside the first groove and a vent plate covering the hole.

The second groove may expose a lower surface of the insulation member.

A method for manufacturing a secondary battery according to the present invention may include the steps of: forming a ring-shaped first groove on the upper surface of a cap plate; insert-injecting an insulation member into the first groove; and forming a ring-shaped second groove connected to the first groove on the lower surface of the cap plate.

A lower surface of the insulation member may be exposed by the second groove, and the cap plate may include a terminal region located inside the insulation member and a main plate located outside the insulation member.

In the step of forming the first groove, protruding grooves may be formed in a horizontal direction on inner and outer walls of the first groove.

The insulation member may include protrusions filled in the protruding grooves.

The method may further include forming a hole outside the first groove and forming a vent plate covering the hole.

Advantageous Effects of Invention

The secondary battery according to an embodiment of the present invention includes a cap plate into which an insulation member is insert-injected, and thus having a simplified cap assembly structure to save costs and ensuring an inner space to increase capacity of the secondary battery.

BEST MODE

Hereinafter, a preferred embodiment of the present invention will be described in detail with reference to the accompanying drawings.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this invention will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

Figure 1:
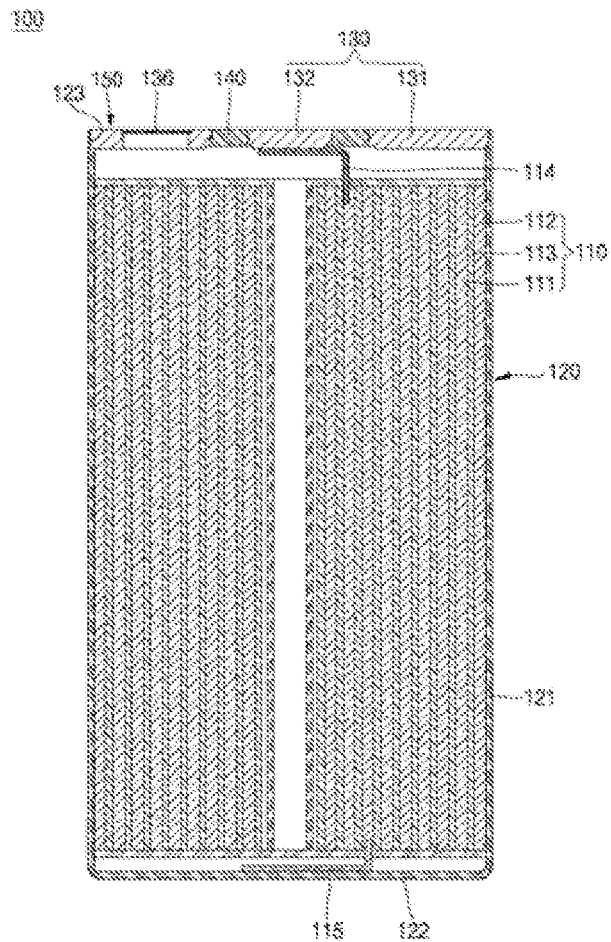
FIG. 1 is a cross-sectional view of a secondary battery according to an embodiment of the present invention.

FIG. 1 is a cross-sectional view of a secondary battery according to an embodiment of the present invention.

Referring to FIG. 1, a secondary battery 100 according to an embodiment of the present invention may include an electrode assembly 110, a case 120, and a cap assembly 150.

The electrode assembly 110 includes a first electrode 111 and a second electrode 112 and a separator 113 interposed between the first electrode 111 and the second electrode 112. The electrode assembly 110 may be formed by winding a laminate of the first electrode 111, the separator 113, and the second electrode 112 in a jelly-roll shape. Here, the first electrode 111 may act as a positive electrode, and the second electrode 112 may act as a negative electrode. A first electrode tab 114 is formed on the upper part of the electrode assembly 110 and connected to the cap assembly 150, and a second electrode tab 115 is formed on the lower part and connected to the lower plate 122 of the case 120.

The first electrode 111 is formed by applying a first electrode active material such as a transition metal oxide to a first electrode current collector formed of a metal foil such as aluminium. A first electrode uncoated portion to which the first electrode active material is not applied is formed on the first electrode 111, and a first electrode tab 114 is attached to the first electrode uncoated portion. One end of the first electrode tab 114 is electrically connected to the first electrode 111, and the other end protrudes upward from the electrode assembly 110 and is electrically connected to the cap assembly 150.

The second electrode 112 is formed by applying a second electrode active material such as graphite or carbon to a second electrode current collector formed of a metal foil such as copper or nickel. An uncoated portion of the second electrode to which the second electrode active material is not applied is formed on the second electrode 112, and the second electrode tab 115 is attached to the uncoated portion of the second electrode. One end of the second electrode tab 115 is electrically connected to the second electrode 112, and the other end protrudes downward from the electrode assembly 110 and is electrically connected to the bottom plate 122 of the case 120.

The separator 113 is positioned between the first electrode 111 and the second electrode 112 to prevent a short circuit and to enable the movement of lithium ions. The separator 113 may be made of polyethylene (PE), polypropylene (PP), or a composite film of polyethylene (PE) and polypropylene (PP).

The case 120 includes a side plate 121 which is a cylindrical body having a certain diameter so as to form a space in which the electrode assembly 110 is accommodated, and a lower plate 122 that seals a lower portion of the side plate 121. In some examples, case 120 may be referred to as a cylindrical can. The top opening of the case 120 is opened to seal after inserting the electrode assembly 110 therein. In addition, a stepped portion 123 on which the cap assembly 150 is seated may be formed at an upper end of the case 120. The stepped portion 123 may be a groove formed on an inner surface of the case 120. After the cap assembly 150 is seated on the stepped portion 123, the boundary between the case 120 and the cap assembly 150 is welded, so that the case 120 can be sealed. The second electrode tab 115 may be electrically connected to the lower plate 122 of the case 120. Accordingly, the case 120 may have the same polarity as the second electrode 112.

Figure 2:
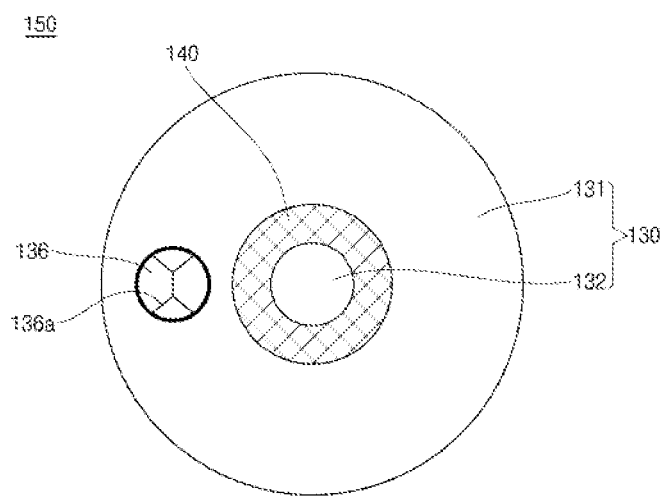
FIG. 2 is a plan view illustrating a cap assembly according to an embodiment of the present invention.
Figure 3:
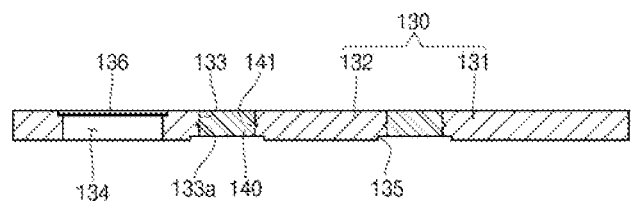
FIG. 3 is a cross-sectional view showing a cap assembly according to an embodiment of the present invention.

FIG. 2 is a plan view illustrating a cap assembly according to an embodiment of the present invention. FIG. 3 is a cross-sectional view showing a cap assembly according to an embodiment of the present invention.

Referring to FIGS. 2 and 3, the cap assembly 150 may include a cap plate 130 and an insulation member 140.

The cap plate 130 may include a main plate 131 and a terminal region 132 positioned inside the main plate 131. The main plate 131 and the terminal region 132 may be electrically separated from each other by an insulation member 140.

The main plate 131 may be coupled to the stepped portion 123 of the case 120. The thickness of the main plate 131 may be formed to be the same as the height of the stepped portion 123. Accordingly, the upper surface of the main plate 131 and the top end of the case 120 may be on the same plane. The case 120 may be sealed by welding an interface between the main plate 131 and the case 120. In some examples, the main plate 131 may have the same polarity as the case 120 and the second electrode 112.

The terminal region 132 is located at the center of the cap plate 130 and can be electrically separated from the main plate 131 by the insulation member 140. The terminal region 132 may be electrically connected to the first electrode tab 114. In some examples, the first electrode tab 114 protruding upward from the electrode assembly 110 may be welded to the lower surface of the terminal region 132. Accordingly, the terminal region 132 may have the same polarity as that of the first electrode 111.

The cap plate 130 may be located between the terminal region 132 and the main plate 131, and may include a first groove 133 formed on the top of the cap plate 130 and a second groove 135 formed on the bottom of the first groove 133. The first groove 133 and the second groove 135 may be connected to each other to form a hole penetrating the cap plate 130. In order to electrically separate the terminal region 132 and the main plate 131, the first groove 133 and the second groove 135 may be formed in such a ring shape as to surround the terminal region 132 while penetrating the cap plate 130 have a ring shape that and surrounds the terminal region 132. The insulation member 140 is coupled to the first groove 133, and the insulation member 140 may prevent the main plate 131 and the terminal region 132 from being separated. An inner wall of the first groove 133 may form an outer wall of the terminal region 132, and an outer wall of the first groove 133 may form an inner wall of the main plate 131. Protruding grooves 133a are formed on the inner and outer walls of the first groove 133 in the horizontal direction to fix the insulation member 140 coupled to the first groove 133 so as not to fall out of the cap plate 130. The protruding grooves 133a may be shaped of a ring extending along the inner and outer walls, respectively. In the drawing, the cross section of the protruding grooves 133a is shown as a triangle, but the protruding grooves 133a may be applied in any shape as long as they extend outward from the first groove 133. For example, the cross section of the protruding grooves 133a may be formed in various shapes including a semicircle, a rectangle, an inverted triangle, etc.

The second groove 135 is formed at a position corresponding to the first groove 133. The height of the second groove 135 may be smaller than that of the first groove 133. Since the insulation member 140 connecting the terminal region 132 and the main plate 131 is coupled to the first groove 133, the height of the first groove 133 is preferably smaller than that of the second groove 135. The sum of the height of the first groove 133 and the height of the second groove 135 may be equal to the height of the cap plate 130. In addition, the width of the second groove 135 may be greater than that of the first groove 133.

The cap plate 130 may include a hole 134 formed at one side of the main plate 131 and a bent plate 136 coupled to the hole 134. The bent plate 136 may be formed to have a smaller thickness than the main plate 131, and may have a notch 136a formed therein so as to be opened at a set pressure. In some examples, when the pressure inside the case 120 exceeds a set pressure due to overcharging of the secondary battery 100, the notch 136a is broken and the gas inside the case 120 is discharged to the outside, thereby preventing ignition or explosion of the secondary battery 100.

The insulation member 140 may be coupled to the first groove 133 of the cap plate 130. The insulation member 140 may be insert-injected into the first groove 133 to insulate the terminal region 132 and the main plate 131 from each other, and at the same time, may combine the terminal region 132 and the main plate 131 so as not to be separated. In some examples, after being insert-injected into the first groove 133 of the cap plate 130, the insulation member 140 may insulate the terminal region 132 and the main plate 131 from each other by the second groove 135 exposing the lower portion of the insulation member 140. In addition, the insulation member 140 may be shaped of a ring corresponding to the first groove 133.

The insulation member 140 may include protrusions 141 coupled to the protruding grooves 133a. The protrusions 141 are formed to protrude from the inner and outer surfaces of the insulation member 140, and may be coupled to the protruding grooves 133a of the first groove 133. In some examples, the insulation member 140 may include a heat-resistant resin. For example, the insulation member 140 may include poly propylene (PP), polyethylene (PE), or perfluoroalkoxy (PFA).

As described above, in the present invention, unlike in the conventional cylindrical secondary battery in which a cap assembly is coupled to a case by forming a beading part and a crimping part in the case, the cap assembly 150 is directly welded to the case 120, thereby preventing deformation of the cap assembly 150. In addition, the cap assembly 150 of the present invention includes the cap plate 130 in which the insulation member 140 is insert-injected, and thus can have a simplified structure to reduce the costs, and can ensure inner space to increase the capacity of the secondary battery 100 per unit volume.

Figure 4A:
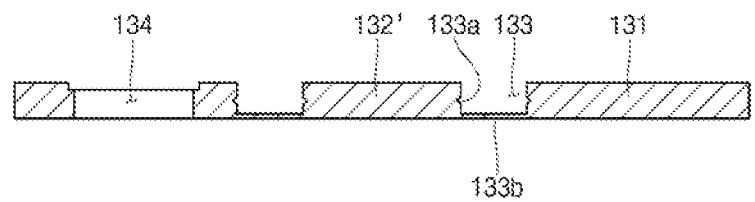
FIGS. 4A to 4D are cross-sectional views illustrating a method for manufacturing a cap assembly according to an embodiment of the present invention.
Figure 4B:
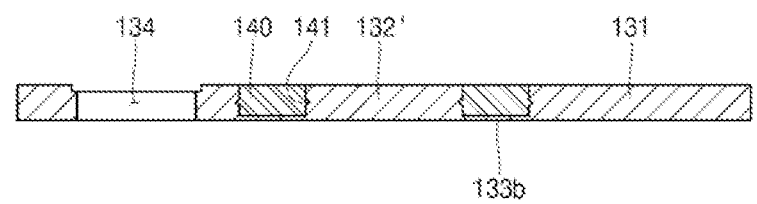

FIGS. 4A and 4B are cross-sectional views illustrating a method for manufacturing a cap assembly according to an embodiment of the present invention.

A method for manufacturing a cap assembly 150 according to an embodiment of the present invention will be described with reference to FIGS. 4A and 4B.

As shown in FIG. 4A, a ring-shaped first groove 133 is formed on the top of the cap plate 130 and a hole 134 penetrating the cap plate 130 is formed outside the first groove 133. The first groove 133 is formed in the shape of a ring not penetrating the cap plate 130, so that a relatively thin bottom surface 133b exists below the first groove 133. The cap plate 130 may be divided into a main plate 131 positioned outside the first groove 133 and an inner region 132' positioned inside the first groove 133. The main plate 131 and the inner region 132' are in a state of being connected by a bottom surface 133b. The inner region 132' may become a terminal region 132 by being separated from the main plate 131 by the second groove 135 in a process to be described later. Protruding grooves 133a are formed on the inner and outer walls of the first groove 133. The hole 134 is formed in the main plate 131 and may serve as a passage through which internal gas is discharged.

As shown in FIG. 4B, an insulation member 140 may be insert-injected into the first groove 133. The insulation member 140 may be seated on the bottom surface 133b located below the first groove 133. In addition, the insulation member 140 may include protrusions 141 corresponding to the protruding grooves 133a. In some examples, the protrusions 141 may be formed by partially filling the protruding grooves 133a of the insulation member 140 when the insulation member 140 is insert-injected into the first groove 133. The protrusions 141 may protrude from the inner and outer surfaces of the insulation member 140, respectively.

Figure 4C:
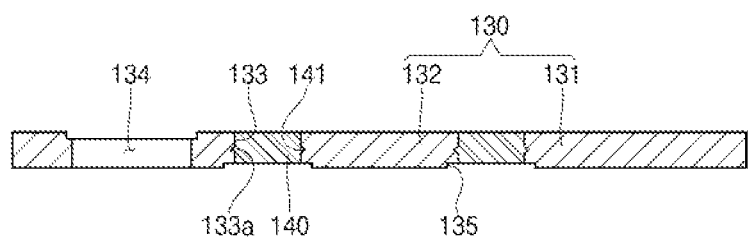

As shown in FIG. 4C, a second groove 135 may be formed below the first groove 133 to form a terminal region 132 separated from the main plate 131. The second groove 135 may be formed on a portion corresponding to the first groove 133, that is, on the bottom surface 133b to expose the lower surface of the insulation member 140. In addition, the second groove 135 may electrically separate the inner region 132' and the main plate 131 to form a terminal region 132. In some examples, the second groove 135 may be formed to be wider than the width of the first groove 133.

Figure 4D:
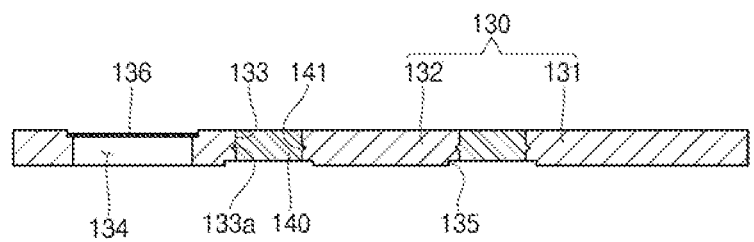

As shown in FIG. 4D, a bent plate 136 may be formed in the hole 134. The bent plate 136 covers the hole 134 and may be welded to the main plate 131. In addition, a rupture groove is formed in the vent plate 136, and when internal gas is generated, the rupture groove is ruptured, thereby releasing the internal gas.

Thereafter, the cap assembly 150 may be welded to the first electrode tab 114 of the electrode assembly 110 accommodated inside the case 120. The first electrode tab 114 may be welded to the terminal region 132 of the cap plate 130. The cap assembly 150 may be seated on the stepped portion 123 of the case 120 and may then be welded to the case 120.

While the foregoing embodiment has been provided for carrying out the secondary battery according to the present invention, it should be understood that the embodiment described herein should be considered in a descriptive sense only and not for purposes of limitation, and various changes in form and details may be made therein without departing from the spirit and scope of the invention as defined by the following claims.

INDUSTRIAL APPLICABILITY

The present invention relates to a secondary battery.

The invention claimed is:

1. A secondary battery comprising:
   an electrode assembly;
   a case for accommodating the electrode assembly; and
   a cap assembly coupled to a top of the case and electrically connected to the electrode assembly,
   wherein the cap assembly comprises: a cap plate having a ring-shaped first groove formed on an upper surface thereof, and a ring-shaped second groove formed on a lower surface thereof and connected to the first groove; and an insulation member insert-injected into the first groove.

2. The secondary battery of claim 1, wherein the cap plate includes a terminal region positioned inside the insulation member and a main plate positioned outside the insulation member.

3. The secondary battery of claim 2, wherein an electrode tab of the electrode assembly may be connected to the terminal region.

4. The secondary battery of claim 1, wherein protruding grooves are formed on inner and outer walls of the first groove in a horizontal direction.

5. The secondary battery of claim 4, wherein the insulation member includes protrusions coupled to the protruding grooves.

6. The secondary battery of claim 1, wherein the cap plate further includes a hole formed outside the first groove and a vent plate covering the hole.

7. The secondary battery of claim 1, wherein the second groove exposes a lower surface of the insulation member.

8. A method for manufacturing a secondary battery, comprising:
   forming a ring-shaped first groove on an upper surface of a cap plate;
   insert-injecting an insulation member into the first groove; and
   forming a ring-shaped second groove connected to the first groove on a lower surface of the cap plate.

9. The method of claim 8, wherein a lower surface of the insulation member may be exposed by the second groove, and the cap plate may include a terminal region located inside the insulation member and a main plate located outside the insulation member.

10. The method of claim 8, wherein in the step of forming the first groove, protruding grooves are formed in a horizontal direction on inner and outer walls of the first groove.

11. The method of claim 10, wherein the insulation member includes protrusions filled in the protruding grooves.

12. The method of claim 8, further comprising forming a hole outside the first groove and forming a vent plate covering the hole.

* * * * *